(No Model.)

L. FLEISCHMAN.
NUT LOCK.

No. 541,159. Patented June 18, 1895.

Witnesses:
W. J. Sankey.
R. H. Orwig.

Inventor: Louis Fleischman,
By Thomas G. and J. Ralph Orwig,
Attorneys.

UNITED STATES PATENT OFFICE.

LOUIS FLEISCHMAN, OF DES MOINES, IOWA.

NUT-LOCK.

SPECIFICATION forming part of Letters Patent No. 541,159, dated June 18, 1895.

Application filed November 24, 1894. Serial No. 529,888. (No model.)

*To all whom it may concern:*

Be it known that I, LOUIS FLEISCHMAN, a citizen of the United States of America, residing at Des Moines, in the county of Polk and State of Iowa, have invented an Improved Nut-Lock, of which the following is a specification.

The object of this invention is to provide a nut lock of the class in which a bolt is provided with a right and left handed screw and two nuts the one with a right handed and the other with a left handed screw adapted to be placed on the bolt and engage each other, with means whereby the nuts may be held together so as not to be capable of being turned separately until released and to provide means whereby the weakest part of the bolt, namely the point at the intersection of the right and left handed screws will be reinforced when the nuts are in place and further in the construction, arrangement and combination therewith of means for unlocking the nuts.

My invention consists in certain details of construction, arrangement, and combination of parts as hereinafter set forth, pointed out in my claims, and illustrated in the accompanying drawings, in which—

Figure 1:
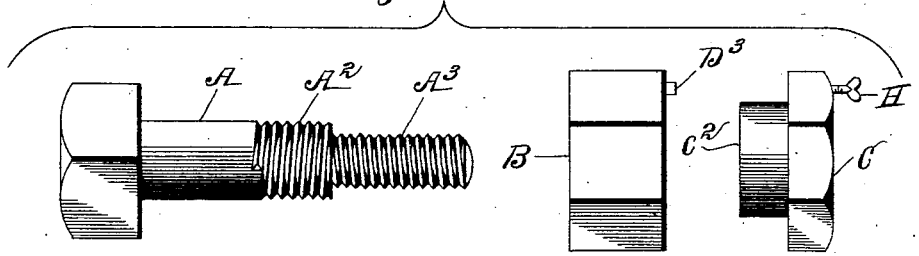
Figure 2:
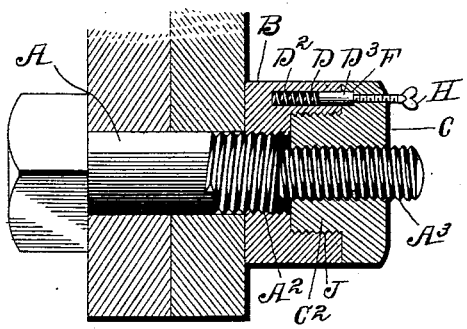
Figure 3:
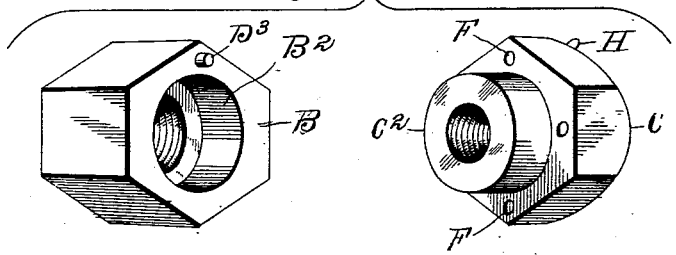

Figure 1 is a side view showing the bolt and the two nuts detached. Fig. 2 is a sectional view showing a modified form of the nut-locks in position to engage and hold together two bars. Fig. 3 is a perspective view showing the two nuts attached.

Referring to the accompanying drawings, the reference letter A is used to indicate a bolt having a left handed screw thread formed thereon at $A^2$ and at its projecting end made smaller in diameter and provided with right handed screw thread $A^3$.

B indicates a nut having an internal left handed screw thread adapted to engage the screw thread at $A^2$ and a bore $B^2$ of much larger diameter than the bolt made in its outer end and extended to its approximate central portion.

C indicates a second nut having an internal right handed screw thread and an annular collar $C^2$ formed on its inner face adapted to enter the bore in the nut B and have its outer surface in close engagement with the interior of the bore.

It will now be readily seen that when both the nuts are in place and in close engagement with each other they cannot become loose or turned in unison and furthermore that the collar $C^2$ by closely engaging the interior of the bore will prevent the bolt from becoming broken or bent at its weakest point, namely the intersection of the two screw threads by an impact on the outer end of the bolt or the outer nut as it would be necessary to first bend or break the collar $C^2$. With two screws having flat meeting surfaces in alignment with the weak point of a bolt said bolt may be easily broken and the remaining nut removed.

I have provided an automatically operating device for locking the two bolts together, so that they may not be turned independently and thus removed from the bolt, as follows: A small bore D is formed in the outer face of the nut B, an extensile coil spring $D^2$ dropped therein and a straight bolt $D^3$ placed on top of the spring. A bore F is formed in the nut C to extend parallel with the central bore and at the same distance from the center of the nut as is the bolt $D^3$, so that when the faces of the two nuts are in proximity and the bolt $D^3$ and said bore F in alignment the end of the said bolt will enter the bore and securely lock the nuts together. To prevent the said bolt $D^3$ from entering the bore before the outer nut is screwed some or to force the same out from the bore F when it is desired to unlock the bolt, I have provided a smaller bore $F^2$ leading outwardly from the bore F and internally screw threaded and a thumb screw H adapted to be placed in said bore and be screwed down so that its lower end will be flush with the inner surface of the nut, thus preventing the entrance of the bolt $D^3$.

In the modified form shown in Fig. 2, coinciding screw thread, J are formed on the juxtaposited faces of the collar $C^2$ and the interior of the nut B. This is sufficient in itself when the bolts are tightly screwed together to lock the bolts to each other and if desirable the locking device may be dispensed with.

In practical use the nut B is first screwed to position then the thumbscrew, H, inserted in the nut C and turned so as to block the end of the bore F. Then the nut C is screwed into position until at the last turn when the screw H is removed and the nut turned until the bolt D³ coincides with the bore F when it will be forced into said bore and the two nuts locked together. When it is desirable to loosen the nut the screw H must first be placed in the bore F and the bolt D³ forced out of engagement with the nut C. A number of the bores F may be formed in the nut C if found desirable and a thumb screw provided for each without departing from the spirit of my invention.

Having thus described my invention, what I claim as new therein, and desire to secure by Letters Patent of the United States therefor, is—

1. An improved nut lock, comprising a bolt having a right and left handed screw thread thereon, a nut adapted to be secured on the bolt and having a bore in its outer surface, a coil spring in said bore, and a straight round bolt on top of the spring, a second nut adapted to screw on said bolt having an oppositely formed screw thread and one or more bores therein parallel with the central bore, passed entirely through the nut and equi-distant from the center thereof, to receive said bolt, for the purposes stated.

2. An improved nut lock, comprising a bolt having a right and left handed screw thread thereon, a nut adapted to be screwed on the bolt and having a bore in its outer surface, a coil spring in said bore, and a straight round bolt on top of the spring, a second nut adapted to screw on said bolt, having an oppositely formed screw thread, and a series of bores therein parallel with the central bore, enlarged at their inner ends to receive said bolt and passed entirely through the nut and screw threaded at their outer ends, for the purposes stated.

3. In combination with a bolt having a right and left handed screw thread, a nut adapted to be placed in the bolt and engage the first screw thread, and having a small bore in its outer face an extensile spring in said bore and a bolt on top of the spring normally projected beyond the surface of the bolt, and a second nut adapted to screw on the opposite thread and having a coinciding bore on its inner face adapted to admit said bolt, a screw detachably inserted in the outer face of the outer nut to force the said bolt out of engagement with the outer nut substantially as set forth.

4. An improved nut lock, comprising a bolt having a right and left handed screw thread, a nut having an internal screw thread adapted to engage the first screw thread, on the bolt and having an enlarged screw threaded orifice at its outer end and also provided with a small bore in its outer face, a spring in said bore and a bolt on top of said spring, a second nut adapted to be screwed on the outer screw thread of the bolt having an integral collar on its inner face adapted to enter said large bore in the first nut and also having one or more bores in its inner face adapted to admit the spring actuated bolt and a thumb screw for each bore passed through the outer nut adapted to fill up the said bores, substantially as and for the purposes stated.

LOUIS FLEISCHMAN.

Witnesses:
J. RALPH ORWIG,
THOMAS G. ORWIG.